United States Patent
Zhuang

(10) Patent No.: US 12,450,789 B2
(45) Date of Patent: Oct. 21, 2025

(54) DEVICE FOR COMBINING DIFFERENT COLORS ON A COMPUTER SCREEN BY USING ELECTRONIC PEN

(71) Applicant: Jian Ming Zhuang, Shenzhen (CN)

(72) Inventor: Jian Ming Zhuang, Shenzhen (CN)

(73) Assignee: SUNIA PTE. LTD, Montreal Spring (SG)

( * ) Notice: Subject to any disclaimer, the term of this patent is extended or adjusted under 35 U.S.C. 154(b) by 245 days.

(21) Appl. No.: 18/142,594

(22) Filed: May 3, 2023

(65) Prior Publication Data

US 2024/0371050 A1 Nov. 7, 2024

(51) Int. Cl.
*G06T 11/00* (2006.01)
*G06F 3/0354* (2013.01)
*G06F 3/041* (2006.01)

(52) U.S. Cl.
CPC ........ *G06T 11/001* (2013.01); *G06F 3/03545* (2013.01); *G06F 3/041* (2013.01)

(58) Field of Classification Search
CPC ..... G06T 11/001; G06F 3/03545; G06F 3/041
USPC ................. 345/173–174, 179, 594
See application file for complete search history.

(56) References Cited

U.S. PATENT DOCUMENTS

| | | | | |
|---|---|---|---|---|
| 5,420,607 A | * | 5/1995 | Miller | G06F 3/037 345/179 |
| 6,377,249 B1 | * | 4/2002 | Mumford | G06F 3/03542 345/173 |
| 2003/0117408 A1 | * | 6/2003 | Forsline | G06F 3/03545 345/581 |
| 2011/0169756 A1 | * | 7/2011 | Ogawa | G06F 3/03545 345/173 |
| 2012/0182271 A1 | * | 7/2012 | Wu | G06F 3/03545 345/179 |
| 2014/0306929 A1 | * | 10/2014 | Huang | G06F 3/04162 345/174 |
| 2016/0048225 A1 | * | 2/2016 | Curtis | G06F 3/03545 345/173 |
| 2017/0134663 A1 | * | 5/2017 | Jin | H04L 51/18 |

* cited by examiner

*Primary Examiner* — Prabodh M Dharia

(57) ABSTRACT

A device for combining different colors on a computer screen by using an electronic pen includes: an electronic pen having a pen head; a palette capable of being displayed in a screen of a display; the palette including a plurality of color sections of various colors; a touch detector serving to detect a contact angle and pressure of the pen head touching one color section of the palette for determining an amount of a dye and the hue of the color touched; a touch converter serving for converting the angle and the pressure to a hue and an amount of dye so that when the electronic pen is used to writer or draw, the output from the pen head having the color; a color combiner used to mix different colors of the color sections which are touched by the pen head continuously so as to obtain a mixing color.

8 Claims, 4 Drawing Sheets

DEVICE FOR COMBINING DIFFERENT COLORS ON A COMPUTER SCREEN BY USING ELECTRONIC PEN

FIELD OF THE INVENTION

The present invention relates to electronic pens, and in particular to device for combining different colors on a computer screen by using an electronic pen.

BACKGROUND OF THE INVENTION

In the prior art computer drawing and writing, a computer provides a palette on the screen of the computer. The user uses an electronic pen to point the color sections on the palette so as to determine the output color of the electronic pen. The number of the colors on the palette is fixed and thus the number of colors outputted from the palette is also limited. As a result, the drawings cannot be vivid with many different colors. Furthermore, if a palette has too many colors, it will cause the user feel fuzzy and confuse in selection of colors.

Some drawing software provides ways for combination of colors, for example, the user can select grey levels of different colors for mixing with one another. However, the user cannot exactly determine grey levels for mixing a desired color, as a result, the user needs to operate repeatedly.

Therefore, the object of the present invention is to provide a novel method which cause that electronic pen present combining different colors easily so as to resolve above mentioned prior art problems.

SUMMARY OF THE INVENTION

Accordingly, the object of the present invention is to provide a device for combining different colors on a computer screen by using an electronic pen, wherein comparing with current technology, in the present invention, the electronic pen is acted as a real pen. The touching pressure, inclination angle, and rotation angle of a pen head touching a color section of a palette in the computer screen are used to simulate colors and amount of dyes of the color which should be applied to the pen head of the electronic pen as it is used to draw or write in the computer screen. The ways used in the present invention is more effective than the prior art ways and can compound different colors easily and conveniently. Furthermore, the present invention provides the function to record the colors of different parts of a pen head so that the pen can provide different colors or the combinations of these colors based on which part touches the screen. Therefore, the pen head could provide different colors which are varied gradually from one color to another color.

To achieve above objects, the present invention provides a device for combining different colors on a computer screen by using an electronic pen, which includes a processor, and a memory; the processor serving to perform operations needed; the memory serving to store computer programs and data related; the device comprising: an electronic pen having a pen head; a palette capable of being displayed in a screen of a display; the palette including a plurality of color sections of various colors; the electronic pen could touch a color section and then the electronic pen can make drawings or write with output being the color expressed by the color section; a color database connected to the palette; the color database storing the digital data for various colors defined in the palette; the data including grey levels and hue levels of a color; a touch detector serving to detect a contact angle and pressure of the pen head touching one color section of the palette on the display screen for determining an amount of a dye of the color expressed by the color section touched by the pen head and the hue of the color touched; a touch converter connected to the touch detector; the touch converter receiving the data about an angle of the pen head with the screen and the pressure applied by the pen head to the screen; the angle and the pressure being converted to a hue and an amount of dye of a color expressed by the color section touched by the pen head so that when the electronic pen being used to writer or draw, the output from the pen head having the color; a color combiner used to mix different colors of the color sections which are touched by the pen head continuously so as to obtain a mixing color which are mixing of the different colors; wherein the color combiner is connected to the color database and the touch converter; the color combiner receives the color and the amount of dye which are acquired by the pen head touching the color sections on the palette; when the pen head touched different color sections on the palette continuously, the color combiner will mix these colors based on the amounts of dyes of these different colors.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Referring to FIGS. 1 to 6, the present invention provides a way for color combination for an electronic pen to touch clock blocks in the palette shown in a computer screen, in that the inclination angle, rotation angles, and touch pressures are used for determination of the colors and amount of colors.

The structure 1 of the present invention mainly includes a processor 2, and a memory 6. The processor 2 serves to perform operations needed in the present invention. The memory 2 serves to store computer programs used in the present invention and the data related in the present invention. All the results about the operation of the present invention and related data thereof are stored in the memory.

Figure 1:
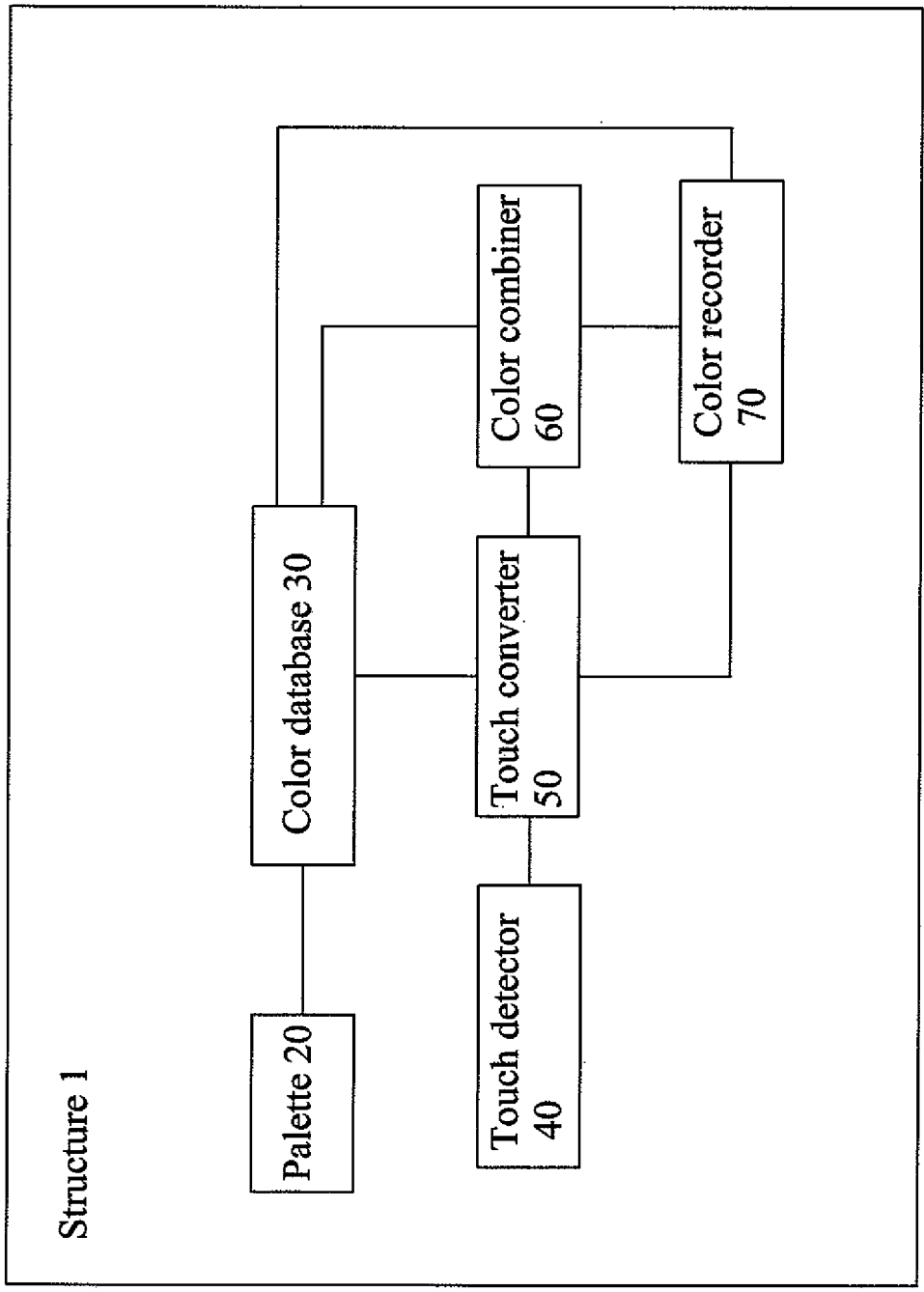
FIG. 1 shows the connections of the elements of the present invention.
Figure 2:
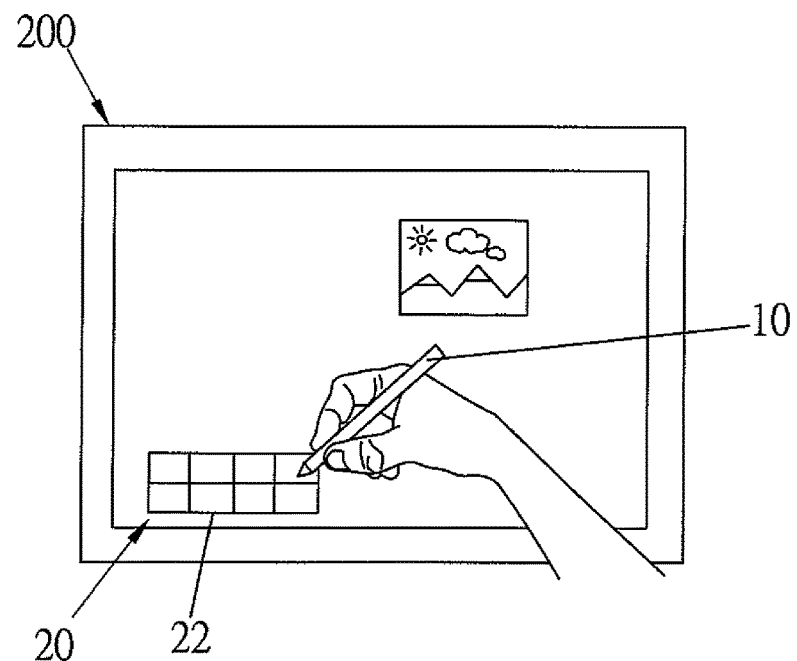
FIG. 2 shows the first embodiment of the present invention, in that the electronic pen could touch any color section in the palette for drawing or writing.

Referring to FIG. 1, the present invention includes the following elements.

An electronic pen 10 includes a pen head 12.

A palette 2 could be shown in a screen 200 of a display includes a plurality of color sections 22 of various colors. The electronic pen 10 could touch a color section 22 and then the electronic pen 10 can make drawings or write with output of the color expressed by the color section 22.

A color database 30 is connected to the palette 20. The color database 30 stores the digital data for various colors defined in the palette 20. The data includes grey levels and hue levels of a color.

A touch detector 40 serves to detect a contact angle and pressure of the pen head 12 touching one color section 22 of the palette 20 on the display screen 200 for determining an amount of a dye for the color expressed by the color section 22 and the hue of the color section 2 touched by the pen head 12.

The display screen 200 is a screen on an electronic device which can be written or plotted by the electronic pen 10, and the electronic device is such as a tablet computer, a written screen, a handset, and others.

A touch converter 50 is connected to the touch detector 40. The touch converter 50 receives the data about an angle of the pen head 12 with the screen 200 and the pressure applied by the pen head 12 to the screen 200. The angle and the pressure are converted to a hue of a color expressed by the color section touched by the pen head 12 and the amount of the dye of the color expressed by the color section so that when the electronic pen 10 is used to writer or draw, the output from the pen head 12 presents the color with the desired hue.

The angle is an inclined angle (an angle between the pen head 12 and a plane of the screen 200) or a rotation angle (an angle connected a central vertical division line and the pen head 12) or other angles.

In the embodiment of the present invention, the inclined angle is used to determine the amount of the dye expressing the color pointed by the pen head 12 and the pressure is used to determine the hue of the color pointed by the pen head 12.

A color combiner 60 is used to combine different colors of the color sections 33 which are touched by the pen head 12 continuously so as to obtain a mixing color of the colors pointed continuously. The way for calculating the mixing of different colors are known in the art and therefore, the details will not be described herein.

The color combiner 60 is connected to the color database 30 and the touch converter 50. The color combiner 60 receives the color and the amount of dye by the pen head 12 on the palette 20. When the pen head 12 touches different color sections on the palette 20 continuously, the color combiner 60 will combine these colors based on the amount of dyes of these different colors pointed by the pen head 12.

Figure 3:
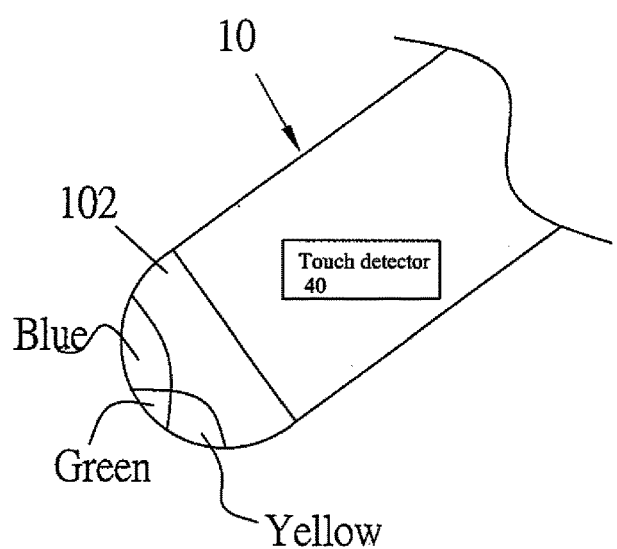
FIG. 3 shows the second embodiment of the present invention, showing the operation of the pen head of the present invention, in that the touch detector is installed in the electronic pen.
Figure 4:
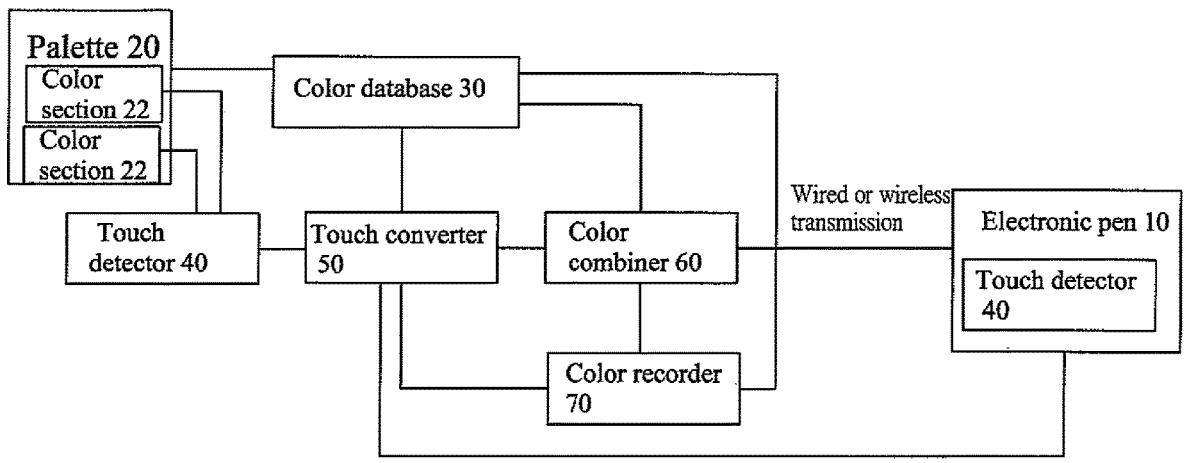
FIG. 4 is a block diagram of the present invention, where the touch detector serves to detect the color and amount of dye of the color after the pen head touches a color section.

In the present invention, the pen head 12 of the electronic pen 10 can simulate the operation of a real pen head 12. Different parts of the pen head 12 can touch different color sections of the palette 20, as a result, these parts of the pen head 12 are given different colors and amounts of dyes based on the touching operation of the pen head 12 on the color sections, while for regions overlapping by two adjacent parts will present the combination of colors owned by the two adjacent parts. For example, one part is given blue color, and another adjacent region is given yellow color, a region overlapped by the two parts will present green color, as illustrated in FIG. 3. The touch detector 40 serves to detect touch portion of the pen head 12 as the electronic pen 10 touches color section 22 of the palette 20, and then the color of the color section 22 and the amounts of dyes based on the touch of the pen head 12 to the color section 22 are assigned to the touch portion. When different portions of the pen head 12 touch different color sections 22 of the palette 20, each portion of the pen head 12 will be assigned with the color of the color section 22 and the amounts of dyes based on this touching as said above. Therefore, when the pen head 12 is used, the pen head 12 will present different colors based on which part of the pen head 12 touches the screen for writing or drawing.

Figure 5:
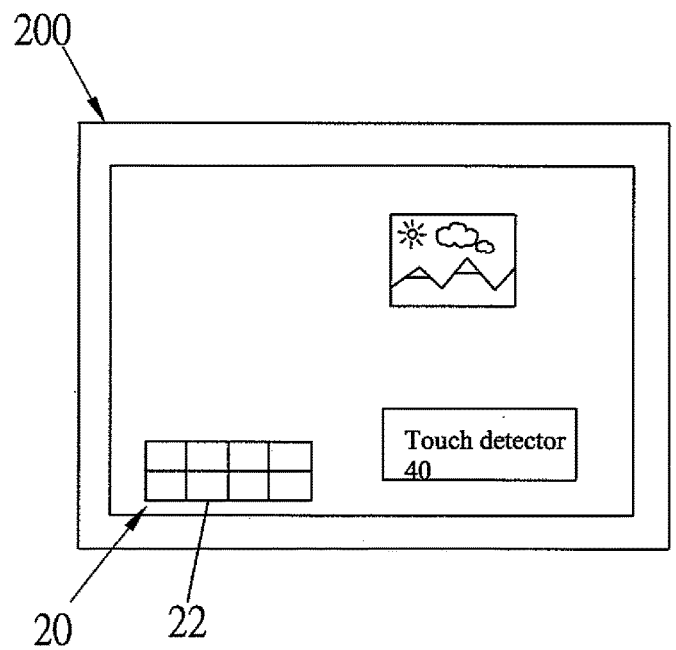
FIG. 5 shows one embodiment of the present invention, wherein it shows that the touch detector is installed in the screen.
Figure 6:
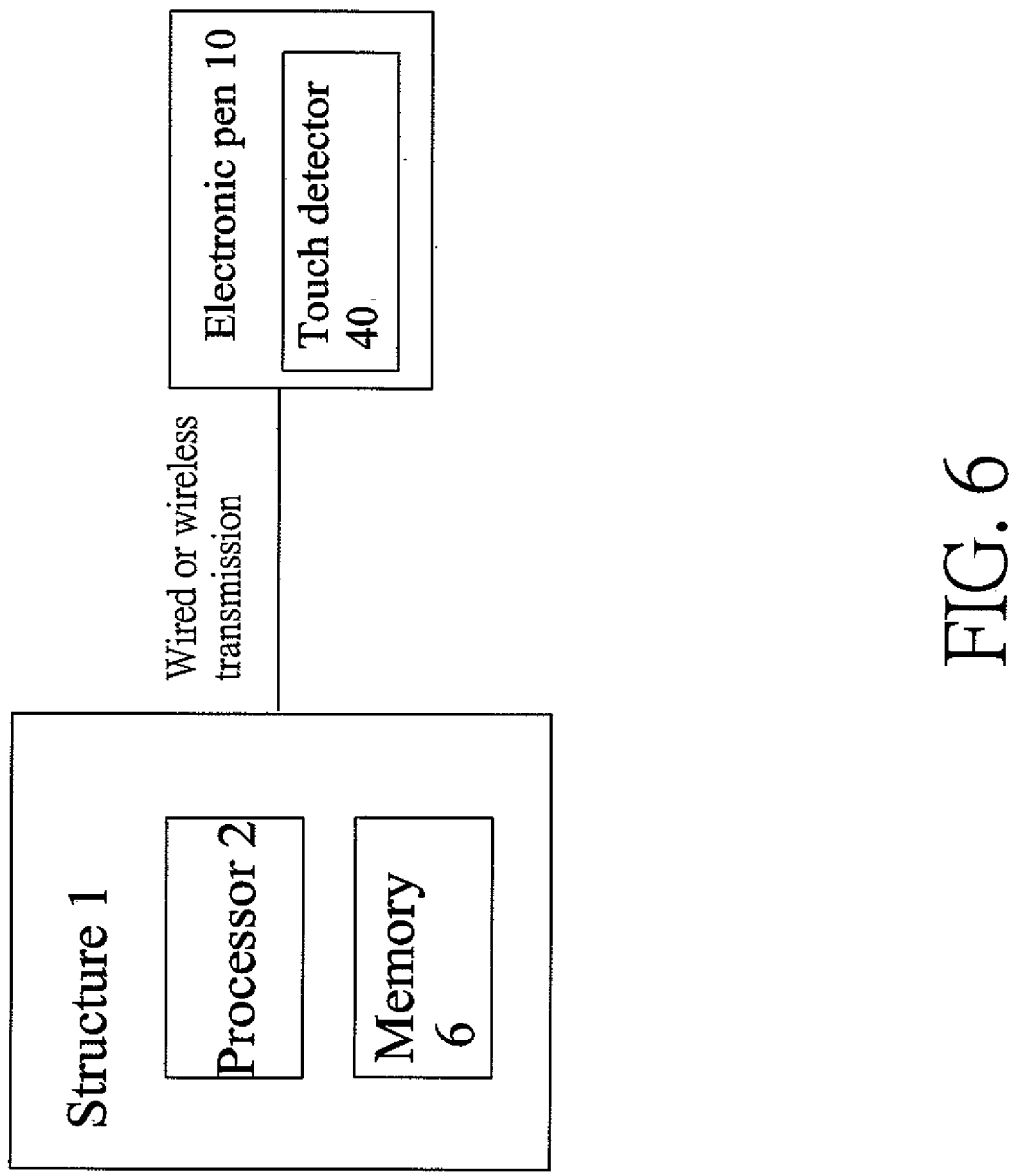
FIG. 6 shows the structure of the present invention.

As illustrated in FIG. 5, the touch detector 40 is installed in the screen 200 for detecting an angle, pressures, coordinates of the touch portion of the electronic pen 10 are detected on the screen 200. As illustrated in FIG. 3, the touch detector 40 is installed in the electronic pen 10 for detecting an angle, pressures, coordinates of the touch portion of the electronic pen 10 which are detected in the electronic pen 10 and then are transmitted out.

The present invention further includes a color recorder 70 which is connected to the color database 30, the touch converter 50 and the color combiner 70 for recording the colors and amounts of dyes based on the pen head 12 to touch the color sections 22. Furthermore, the recorded results could be displayed on the palette 20. Therefore, next time, these recorded color and amounts of dyes can be obtained again.

Similarly, the colors and amounts of dyes for different portions of the pen head 12 and the corresponding portions can still be recorded in the color recorder 70, and next time, these colors and amounts of dyes can be obtained again by different portions of the pen head 12 so that the user can use the electronic pen 10 to have the same effects.

Comparing with current technology, in the present invention, the electronic pen is acted as a real pen. The touching pressure, inclination angle, and rotation angle of a pen head touching a color section of a palette in the computer screen are used to simulate colors and amount of dyes of the color which should be applied to the pen head of the electronic pen as it is used to draw or write in the computer screen. The ways used in the present invention is more effective than the prior art ways and can compound different colors easily and conveniently. Furthermore, the present invention provides the function to record the colors of different parts of a pen head so that the pen can provide different colors or the combinations of these colors based on which part touches the screen. Therefore, the pen head could provide different colors which are varied gradually from one color to another color.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A device for combining different colors on a computer screen by using an electronic pen, which includes a processor, and a memory; the processor serving to perform operations needed; the memory serving to store computer programs and data related;

the device comprising:

an electronic pen having a pen head;

a palette capable of being displayed in a screen of a display; the palette including a plurality of color sections of various colors; the electronic pen could touch a color section and then the electronic pen can make drawings or write with output being the color expressed by the color section;

a color database connected to the palette; the color database storing the digital data for various colors defined in the palette; the data including grey levels and hue levels of a color;

a touch detector serving to detect a contact angle and pressure of the pen head touching one color section of the palette on the display screen for determining an amount of a dye of the color expressed by the color section touched by the pen head and the hue of the color touched;

a touch converter connected to the touch detector; the touch converter receiving the data about an angle of the pen head with the screen and the pressure applied by the pen head to the screen; the angle and the pressure being converted to a hue and an amount of dye of a color expressed by the color section touched by the pen head so that when the electronic pen being used to writer or draw, the output from the pen head having the color;

a color combiner used to mix different colors of the color sections which are touched by the pen head continuously so as to obtain a mixing color which are mixing of the different colors;

wherein the color combiner is connected to the color database and the touch converter; the color combiner receives the color and the amount of dye which are acquired by the pen head touching the color sections on the palette; when the pen head touched different color sections on the palette continuously, the color combiner will mix these colors based on the amounts of dyes of these different colors;

wherein different part of the pen head is used to touch the color section so that as the part of the pen head is used to draw or written on the screen, color of the output from the pen head is the color expressed by the color section being touched; and wherein the pen head of the electronic pen simulates the operation of a real pen head; the different parts of the pen head can touch different color sections the palette, as a result, these parts of the pen head are given different colors and amounts of dyes based on the touching operation of the pen head, while for regions overlapping by two adjacent parts will present mixing of colors owned by the two adjacent parts; therefore, when the pen head is used, the pen head will present different colors based on which part of the pen head touches the screen for writing or drawing.

2. The device for combining different colors on a computer screen by using an electronic pen as claimed in claim 1, wherein he angle is an inclined angle or a rotation angle.

3. The device for combining different colors on a computer screen by using an electronic pen as claimed in claim 1, wherein, an inclined angle is used to determine the amount of the dye of the color and the pressure is used to determine the hue of the color.

4. The device for combining different colors on a computer screen by using an electronic pen as claimed in claim 1, wherein the touch detector is installed in the screen for detecting an angle, pressures, coordinates of the touch portion of the electronic pen.

5. The device for combining different colors on a computer screen by using an electronic pen as claimed in claim 1, wherein the touch detector is installed in the electronic pen for detecting an angle, pressures, coordinates of the touch portion of the electronic pen.

6. The device for combining different colors on a computer screen by using an electronic pen as claimed in claim 1, further includes a color recorder which is connected to the color database, the touch converter and the color combiner for recording the colors and amounts of dyes based on the pen head to touch the color sections; and the recorded results could be displayed on the palette.

7. The device for combining different colors on a computer screen by using an electronic pen as claimed in claim 6, wherein the colors and amounts of dyes for different portions of the pen head and the corresponding portions are recorded in the color recorder, and next time, these colors and amounts of dyes can be obtained again by different portions of the pen head so that the user can use the electronic pen to have the same effects.

8. The device for combining different colors on a computer screen by using an electronic pen as claimed in claim 1, wherein the electronic device is selected from one of a tablet computer, a written screen, and a handset.

* * * * *